United States Patent [19]
Doria

[11] Patent Number: 6,079,319
[45] Date of Patent: Jun. 27, 2000

[54] DOMESTIC ELECTRIC DEVICE FOR COOKING FOOD

[75] Inventor: Alessandro Doria, Milan, Italy

[73] Assignee: Termozeta S.P.A., Milan, Italy

[21] Appl. No.: 09/257,373

[22] Filed: Feb. 25, 1999

[30] Foreign Application Priority Data

Nov. 13, 1998 [IT] Italy .................................. MI98A2473

[51] Int. Cl.⁷ .................................................. A47J 37/00
[52] U.S. Cl. .............................. 99/331; 99/337; 99/427; 99/443 R; 99/450
[58] Field of Search ............................ 99/339, 348, 340, 99/386, 400, 401, 426, 427, 443 R, 337, 443 C, 338, 444–446, 447, 449, 450, 476, 477, 468, 331; 366/69, 96–98, 144–147, 601; 426/501, 512, 520, 523; 219/492, 389, 400; 34/186, 225; 126/21 A, 41 R

[56] References Cited

U.S. PATENT DOCUMENTS

| | | | |
|---|---|---|---|
| 4,155,294 | 5/1979 | Langhammer et al. | .................. 99/427 |
| 4,491,065 | 1/1985 | Poulson | ..................... 99/327 |
| 5,134,927 | 8/1992 | McCarthy, III et al. | ............. 99/450 X |
| 5,579,681 | 12/1996 | Ubert et al. | ........................... 99/357 X |

*Primary Examiner*—Timothy Simone
*Attorney, Agent, or Firm*—Sughrue, Mion, Zinn, Macpeak & Seas, PLLC

[57] ABSTRACT

A domestic electric device for "dry" cooking foodstuffs includes a parallelepiped container defining a cooking chamber for foodstuffs inside it. Heating elements are mounted on a pair of opposed side walls of the container to irradiate heat inside the cooking chambers. A cylindrical openable basket is removably housed inside the cooking chamber of the container to receive the foodstuffs to be cooked. The basket is rotatably motor-driven about a rotation axis X—X extending in a direction which is substantially horizontal and parallel to the aforesaid side walls of the container. The cooking device further includes an external body provided, on an upper surface thereof, with a window, which can be closed for allowing the insertion and/or the removal of the basket into and from the container cooking chamber, respectively.

23 Claims, 4 Drawing Sheets

DOMESTIC ELECTRIC DEVICE FOR COOKING FOOD

BACKGROUND OF THE INVENTION

The present invention relates to a domestic electric device for cooking food, in particular foodstuffs which are sliced or cut in pieces. More particularly the invention relates to a domestic electric device wherein the cooking of foodstuffs is effected by means of the heat generated by suitable heating means, properly located inside the container.

Various types of domestic electric devices of the above mentioned kind are known. These are essentially containers, inside which a cooking chamber is defined for housing the food to be cooked, and provided with suitable heat sources (generally speaking, electric resistors) suitably housed near the side surfaces of the container itself, all around the cooking chamber.

In such devices, the cooking takes place typically in two ways: by heating (by irradiation and/or natural and/or forced convection of the heat generated by the heat sources), and then maintaining the cooking chamber at high temperature; accordingly the chamber has to be suitably insulated from the outside (as for example in the electrical ovens), or by heating at high temperature a bath of a cooking fluid (typically water or oil) wherein the foodstuffs to be cooked are dipped (as for example in the boiler and/or fryers appliances).

Differently from these last appliances, wherein the cooking cannot occur without the provision of a cooking fluid, in the ovens the cooking may be of the so-called "dry" type, as no cooking fluid needs to be used; in this instance, exclusively the water and fat content inside the foodstuffs to be cooked is exploited.

Above all with respect to frying, the "dry" cooking has remarkable advantages.

A first advantage is of economic nature and is related to the fact that no cooking fluid is needed, that after a certain number of cooking cycles has to be replenished.

A second advantage is related to the fact that the "dry" cooked foodstuffs are not drenched with the cooking oil and are more digestible and not injurious to the consumer health; in fact oil, after a certain number of cooking cycles, tends to degrade thus causing the formation of harmful compounds and a deterioration of the organoleptic characteristics of the cooked foodstuffs.

Furthermore, because an oil bath to be heated is not provided, the dry cooking of food occurs more quickly than by frying.

Nevertheless, foodstuffs cooked by frying taste better and have a nicer aspect (due to the particular gilding of the external surface), features that are often desired and not equally obtainable by means of different cooking processes.

The technical problem at the basis of the present invention is that of providing a simple to manufacture and economic device able to carry out the dry cooking of foodstuffs of different kind, providing these with taste and aesthetical properties similar to those obtainable by frying.

SUMMARY OF THE INVENTION

Therefore, the invention relates to an electric kitchen device for cooking food, characterized in that it comprises:

- a substantially parallelepiped container defining a cooking chamber for foodstuffs inside it;
- heating means housed on a pair of opposed first side walls of the container and intended to supply heat inside the cooking chamber;
- a substantially cylindrical openable basket, removably housed inside the cooking chamber of the container and intended to receive the foodstuffs to be cooked, the basket being rotatably motor-driven about a rotation axis X—X, extending in a direction which is substantially horizontal and parallel to the pair of opposed first side walls of the container;
- a body provided, on an upper surface thereof, with a window adapted for allowing the insertion and the removal of the basket into and from the container cooking chamber, respectively.

Hence, we are making reference to a particularly simple to manufacture and economic device. Advantageously, such device effects a dry cooking of foodstuffs, providing them with taste and aesthetical properties similar to those of fried food, without having the typical drawbacks of the oil-bath frying.

The Applicant has carried out a number of cooking tests on various types of both fresh and deep-frozen foodstuffs (such as for example, chips, sea food, fish sticks, etc.) using both the device according to the present invention and a common electric fryer and has surprisingly verified that, at the end of cooking, the food cooked with the device according to the invention has a taste and an aspect essentially similar to those of fried food in the fryer. Such similarity is more evident for partially pre-fried deep-frozen foodstuffs.

Advantageously, the cooking by means of the cooking device according to the invention is quicker than that by means of the fryer (because of the lack of an oil bath to be warmed up when switching on); furthermore, when cooking is completed, the device according to the invention has residues of cooking in a dramatically lower amount than what is to be found in the fryer. Also, the cooking by means of the device according to the present invention generates no unpleasant odor, nor oil jets or detris due to the formation of oil vapors.

Preferably, the device according to the invention comprises a cover intended to close the body during the cooking.

In the device according to the invention, the cooking occurs both for heating at high temperature in the cooking chamber wherein the foodstuffs to be cooked are positioned, and for direct heat irradiation by the heating means to the aforesaid foodstuffs.

In order to optimize such cooking, the cover comprises, preferably, a lid hinged on the upper surface of the body.

In alternative, the cover comprises a tray intended to being removably associated to the body in correspondence of the window and provided with a plurality of vent holes.

Advantageously, the tray has three important tasks: first of all it prevents that the basket or the cooking chamber may be incidentally or on purpose accessed during the cooking; further on, thanks to the presence of the vent holes, it creates conditions of homogeneous cooking inside the cooking chamber, controlling the convection flow of hot air; finally, it can be used as service tray on which the foodstuffs may be poured just after having being cooked, in order to serve them. Advantageously, the vent holes enable the maintenance at high temperature of the foodstuffs just cooked and placed on the tray, prior to being served, while the device carries out a new cooking cycle.

Preferably, the device according to the invention comprises a safety switch, intended to activating the heating means exclusively when the cover is in the closing position for the body and for deactivating them when the cover is brought to the opening position.

Preferably, the device according to the invention further comprises a removable drawer housed in the body below the container and arranged for collecting and removing the cooking residues.

The housing of the basket inside the cooking chamber and its rotation during the cooking itself is carried out by means of technical solution of easy construction and low cost. Preferably, the device according to the invention comprises a pair of discs for supporting the basket, which are rotatably mounted in the container in correspondence of a pair of opposed second side walls provided substantially perpendicular to the pair of opposed first side walls, the basket supporting discs being rotationally driven by an electric motor, with a plurality of transmission gears being interposed, and intended to dragging in rotation the basket. Still more preferably, the plurality of transmission gears comprises two opposed sets of gear wheels, each of which being in meshing engagement with a gear wheel coaxially associated to each of the supporting discs of the basket, on the opposed side with respect to the cooking chamber and integral with said disc, and a countershaft substantially parallel to the rotation axis X—X of the basket, associated to two opposed gear wheels of the two sets of gear wheels and intended for transmitting the rotary motion from one set of gear wheels to the other.

Advantageously, each basket supporting disc has a side surface facing toward the inside of the cooking chamber and comprising a seat for housing the basket. More advantageously, the seat for housing the basket comprises a groove extending in a substantially radial direction in the disc and having a radially external funnel-shaped portion and a radially internal substantially straight portion, an intermediate portion intended for transmitting the motion between the disc and the basket being provided between the radially external portion and the radially internal portion. The particular arrangement of the seat for housing the basket guarantees an easy and correct positioning of the basket inside the cooking chamber, and at the same time, an effective transmission of the rotary motion.

Preferably, the device according to the invention further comprises two driving plates mounted in the container in correspondence of the pair of opposed second side walls above the discs for supporting the basket, adapted for further facilitating the insertion and removal of the basket into and from the cooking chamber, respectively.

Advantageously, each driving plate comprises a side wall facing toward the inside of the cooking chamber, wherein a funnel-shaped groove with a substantially vertical axis is provided, and a lower surface which is of a complementary shape with respect to the basket supporting disc. Still more advantageously, the funnel angle of the radially external portion of the groove provided in the basket supporting discs is greater than that of the funnel of the groove provided in the driving plates, so allowing the easy insertion and removal of the basket into and from the cooking chamber, respectively, even when the basket supporting discs are not exactly positioned in the correct basket insertion/removal position. The correct position is when the funnel of the radially external portion of the groove provided in the basket supporting discs is on axis with the funnel of the groove provided in the driving plates.

Preferably, the device according to the invention also comprises means for controlling the angular position of the basket inside the cooking chamber, so to bring at the end of the cooking cycle the basket in the aforementioned correct insertion/removal position. Such means comprises, in particular, a control knob mounted on the outside of the body and fit on the countershaft. Alternatively, the adjustment of the angular position of the basket can be effected automatically.

Preferably, the openable basket comprises a wire cylinder provided, in correspondence of a first generating line thereof, with opposed portions of adjacent side surfaces, said portions being mutually intended to moving away or getting near, when the basket is maneuvered in opening or closing, respectively. Still more preferably, the wire cylinder comprises two essentially semicylindrical wire surfaces, each one being associated, in correspondence of the respective base ends, to opposed first and second essentially semicircular head plates, each plate of the first and second head plates of one of the two wire surfaces being hinged to the other plate of the first and second head plates of the other of the two wire surfaces in correspondence of a second generating line for the cylinder, which is diametrically opposed to the first generating line. The opening/closing of the basket is therefore achieved by means of technical solutions of easy construction and low cost.

Preferably, each wire surface is associated to the respective head plates at a peripheral edge thereof, and extends for a smaller angle than the extension angle of the plates themselves, each plate of the first and second head plates of one of the two wire surfaces being intended to partially laying on the other plate of the first and second head plates of the other wire surface when the basket is brought in the closing position, in such a way that the two portions of side surface of the wire cylinder are moved to a position where they are adjacent and side-by-side. In this way, the risk is avoided that possible losses of foodstuffs from the basket occur during its rotation.

Preferably, each plate comprises at least one motion transmission peg intended to being housed in the intermediate portion of the groove provided in the basket supporting discs, so to allow an easy and effective drag in rotation of the basket.

Preferably, the device according to the invention further comprises means for controlling the opening of the basket. In particular such means comprises resilient means which, in the rest position, maintains the basket in conditions of partial opening and, when loaded, brings the basket in a position of greater opening.

Preferably, the resilient means comprises an essentially annular spring housed in a respective peripheral seat formed in the first and second head plates and pliers-shaped gripping means intended to contrast the elastic force of the spring when the pliers are tightened, so to further move mutually away the two portions of side surface of the wire cylinder and therefore further open the basket.

According to the above disclosure, the basket is in its rest position in the configuration of partial opening; such opening may be increased in order to carry out in an easier way the steps of foodstuffs loading/unloading, simply by tightening the pliers of the gripping means. Then the basket is inserted inside the body, positioning it in the respective housing seats; during the insertion, the basket goes closing. In operation, the basket rotates whereas the gripping means are fixed.

According to a preferred embodiment, the cooking device according to the invention further comprises means for limiting the opening of the basket: preferably this means comprises a pair of plates, each provided with a pair of slide pins, adapted for being housed in a respective slide slot provided on each one of the first and second head plates.

Advantageously, each plate comprises, on the opposed side with respect to the pair of slide pins, a further peg adapted for being housed in the radially internal portion of the seat for housing the basket provided in the basket supporting discs.

BRIEF DESCRIPTION OF THE DRAWINGS

Further features and advantages of the device according to the present invention will appear more clearly from the following detailed description of a preferred embodiment, made with reference to the attached drawings. In such drawings.

DETAILED DESCRIPTION OF THE INVENTION

Figure 1:
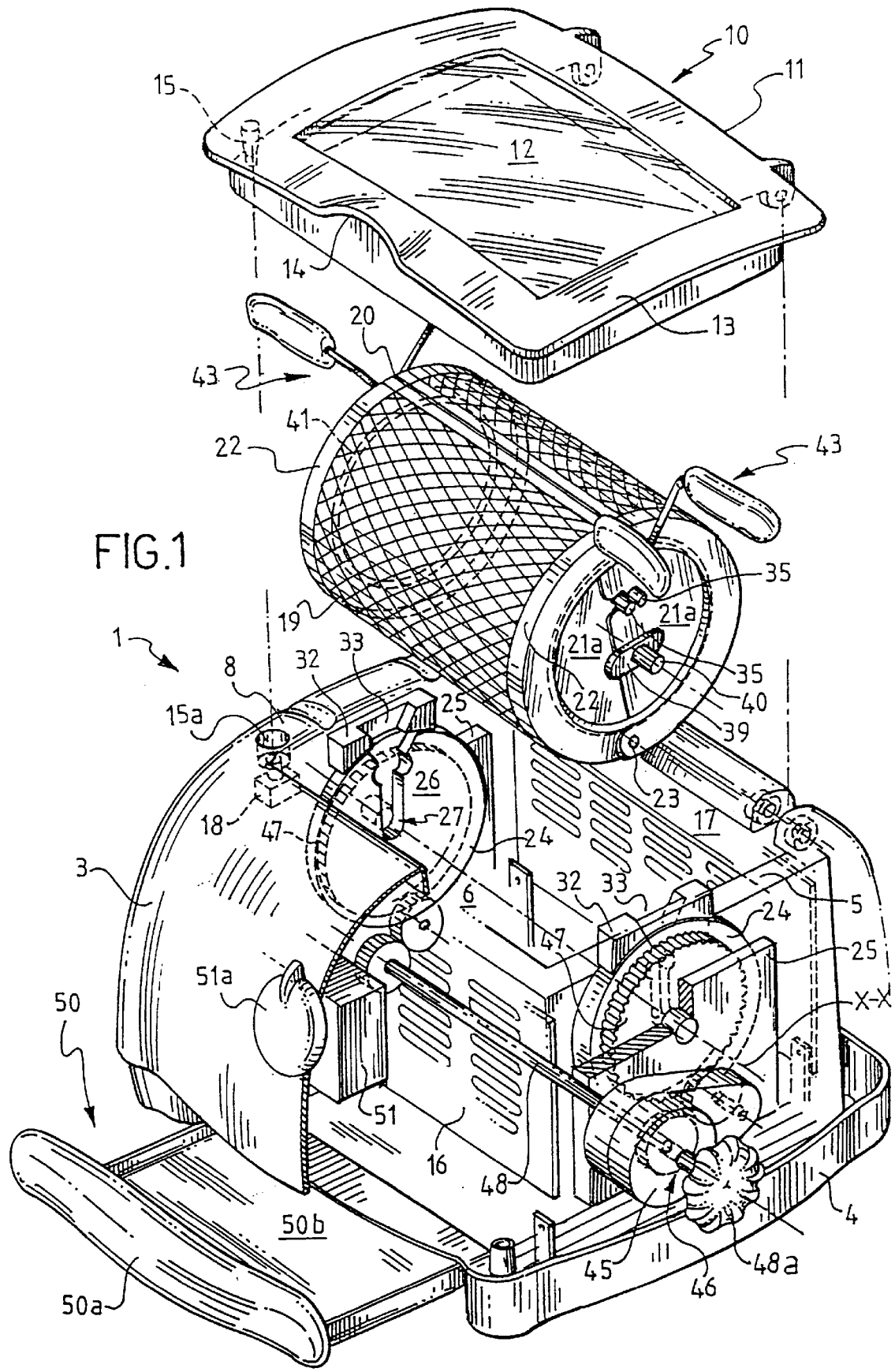
FIG. 1 shows a perspective exploded view of a partially sectioned cooking device according to the invention.
Figure 2:
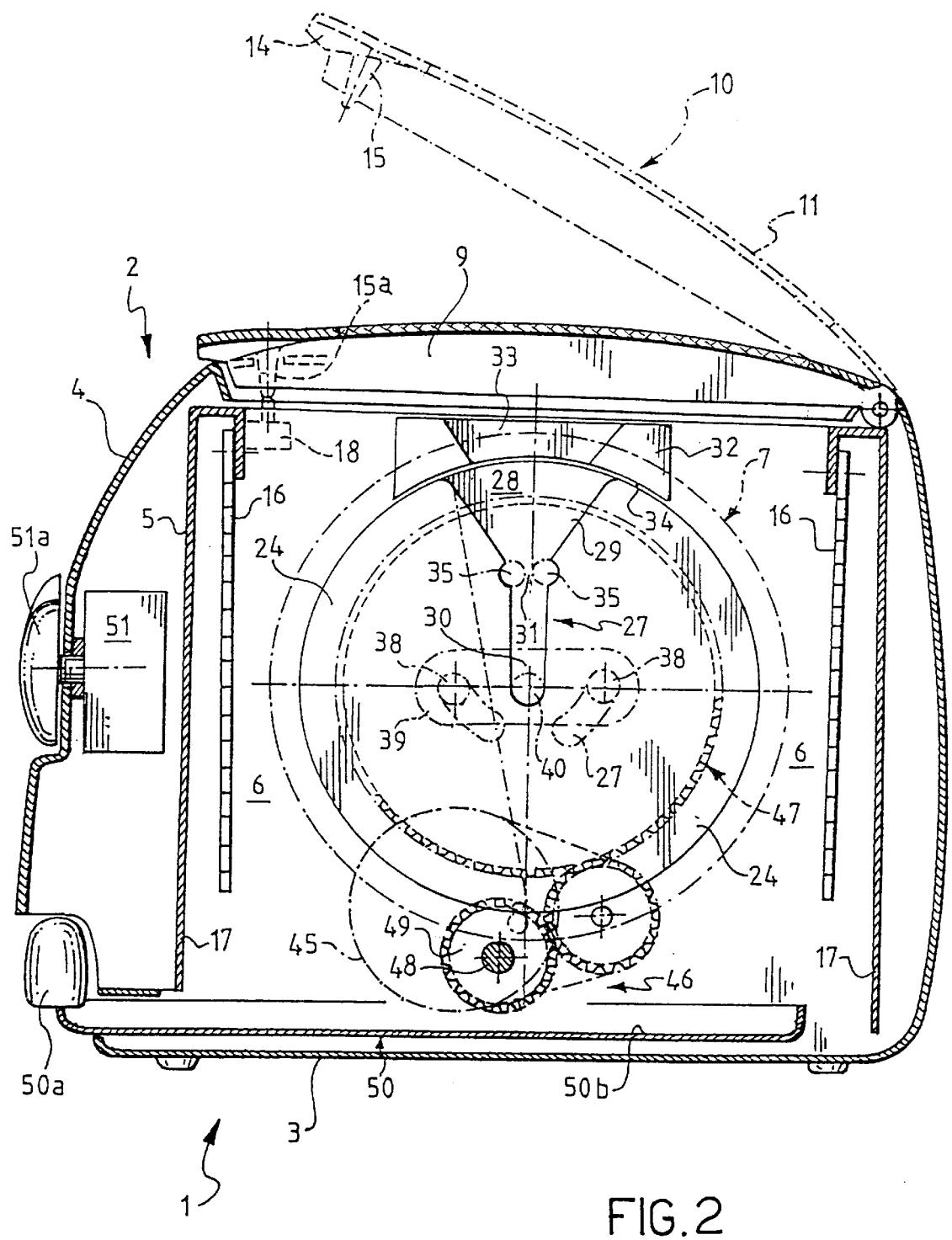
FIG. 2 shows a cross-section side view of the device of FIG. 1.

In such drawings, with the reference 1 is indicated a domestic electric device according to the invention, intended for cooking food of different nature, in particular, but not exclusively, sliced or cut in small pieces, fresh or deep-frozen. The device 1 comprises an external body 2 provided with a support base 3 and an upper box-shaped body 4, connected each other in a known way (for example by means of self-tapping screws). The base 3 and the box-shaped body 4 are both made of plastic material, for example injection-molded polypropylene.

A container 5, realized in zinc plated steel, and having an essentially parallelepiped shape, is mounted on the base 3 of the body 2, inside the box-shaped body 4. Inside the container 5, a cooking chamber 6 is defined intended to removably housing an openable basket 7 containing the foodstuffs to be cooked.

The body 2 has, on an upper surface 8 of the box-shaped body 4, a window 9 adapted for allowing the insertion and removal of the basket 7 into and from the cooking chamber 6 of the container 5.

A cover 10 is associated to the body 2 in correspondence of the window 9 to close the body 2 during the cooking steps of the foodstuffs. The cover 10 is made as lid 11 hinged on the upper surface 8 of the body 2. The lid 11 is provided with a glass plate 12 associated to a frame 13 provided with a gripping handle 14.

In an alternative embodiment (not shown) of the device 1 according to the present invention, the cover 10 comprises an essentially flat tray, made for example of chromium-plated steel and two gripping handles made of plastic material and associated to the tray in correspondence of opposed parts of a peripheral edge thereof.

The tray is provided with a plurality of calibrated vent holes adapted for guaranteeing an optimum cooking of the foodstuffs placed inside the cooking chamber and the maintenance at relatively high temperature of those just cooked and placed onto the tray itself before being served, respectively.

The lid 11 comprises a tooth 15 intended to being housed within a respective seat 15a formed in the upper surface 8 of the body 2.

The device 1 according to the invention comprises heating means 16 (typically plates provided with printed electric resistors) intended to supplying heat inside the cooking chamber 6 and housed on a pair of opposed first side walls 17 internal to container 5. Two protection grids (not shown) made of zinc-plated steel are interposed between the electric resistors and the cooking chamber 6.

A safety switch 18, of in se known type, is mounted inside the body 2 in correspondence of the seat 15a. The switch 18 is intended to activating the heating plates 16 when the lid 11 is brought into the closing position of the body 2 and for deactivating them when the lid 11 is brought into the opening position of the body 2. Accordingly, the presence of the lid 11 in the closing position of the body 2 is needed in order to activate the plates 16 and hence to start the cooking of the foodstuffs present inside the body itself.

The basket 7 is essentially cylindrical and is rotatably mounted inside the cooking chamber 6 about a rotation axis X—X extending in a substantially horizontal direction and parallel to the pair of opposed first side walls 17. In operation, the rotation axis X—X coincides with the symmetry longitudinal axis of basket 7.

The basket 7 comprises a wire cylinder 19 which can be opened in correspondence of a first upper generating line 20 thereof and is provided with opposed adjacent side surface portions 19a, 19b intended to be moving away and getting near with respect to each other when the basket 7 is respectively maneuvered for opening or closing it.

More in particular, the basket 7 is comprised of two semicylindrical surfaces in expanded stainless steel wire frontally positioned side-by-side and mutually linked at the respective base ends thereof by means of opposed first and second head plates, respectively indicated with 21a and 21b, made of stainless steel stamped sheet and having a substantially semicircular shape. The wire semicylindrical surfaces are welded to the head plates 21a, 21b at a peripheral edge 22 thereof and extend for an angle lower than the extension angle of the plates themselves (FIG. 5). Furthermore, the two head plates 21a, as well as the two plates 21b are mutually hinged in correspondence of a second lower generating line 23 of the cylinder 19, diametrically opposed to the first generating line 20, in such a way to allow their mutual fan-shaped movement and hence the opening or closing of the basket 7. In this way, when the basket 7 is brought into the closing position, the two head plates 21a and, analogously, the two plates 21b partially lay the one on the other, whereas the portions 19a, 19b of side surface of the wire cylinder 19 are adjacent and located side-by-side (FIG. 4, wherein the basket is shown in the position achieved inside the body).

In an alternative embodiment (not shown), the positions of the first generating line 20 and of the second generating line 23 are mutually inverted, in such a way that the opening of the basket 7 occurs in correspondence of the lower generating line of the basket 7 itself.

A pair of discs 24 for supporting and dragging the basket 7 in rotation, is rotatably mounted about the rotating axis X—X inside the container 5 on a pair of opposed second side walls 25 provided substantially perpendicular to the first side walls 17. Each disc 24 is in turn provided with a side surface 26 facing the cooking chamber 6 and comprising a seat 27 for housing the basket 7.

The seat 27 comprises a groove 28 extending in the disc 24 in a substantially radial direction and having a radially external funnel-shaped portion 29, a radially inner substantially straight portion 30 and a intermediate portion 31 intended to housing means for the transmission of the rotary motion between the disc 24 and the basket 7. The form of the groove 28 enables the basket 7 to close automatically as it is inserted inside the body 2.

In the second walls 25 of the container 5, above the discs 24 for supporting and dragging the basket 7, a pair of guiding plates 32 are mounted, adapted for making the insertion and extraction of the basket 7 into and from the cooking chamber 6 easy. The plates 32 comprise a side wall facing toward the inside of the cooking chamber 6, in which a substantially vertical funnel-shaped groove 33 is formed, and a lower surface 34 shaped in a complementary way to the supporting discs 24. Advantageously, the funnel angle of the radially external portion 29 of the groove 28 provided in the discs 24 is greater than that of the funnel of the groove 33, provided in the driving plates 32. This allows the insertion and removal of the basket 7 into and from the cooking chamber 6, respectively, to be easier, even when the discs 24 are not in the correct basket insertion/removal position. In particular, such position is that in which the funnel of the radially external portion 29 of the groove 28 provided in the discs 24 is aligned with the funnel of the groove 33 provided in the driving plates 32.

Each of the head plate 21a, 21b comprises a motion transmission peg 35, intended to being housed in the intermediate portion 31 of the groove 28 provided in the discs 24, so to allow the basket 7 to be dragged in rotation.

Figure 4:
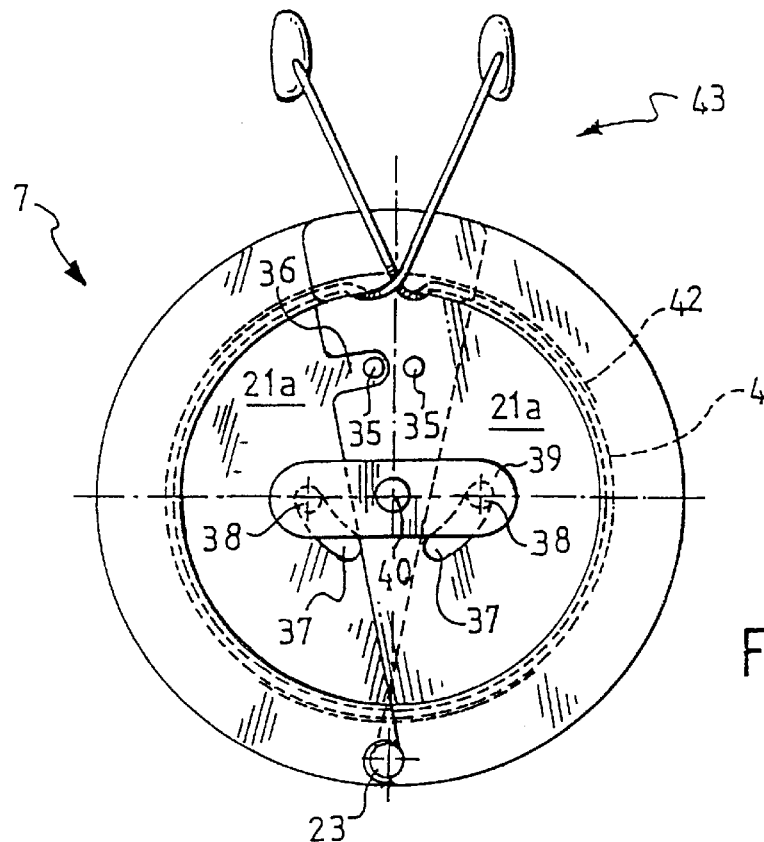
FIGS. 4 and 5 show a schematic side view of the detail of FIG. 3 in two different working configurations (basket in open and close position, respectively).
Figure 5:
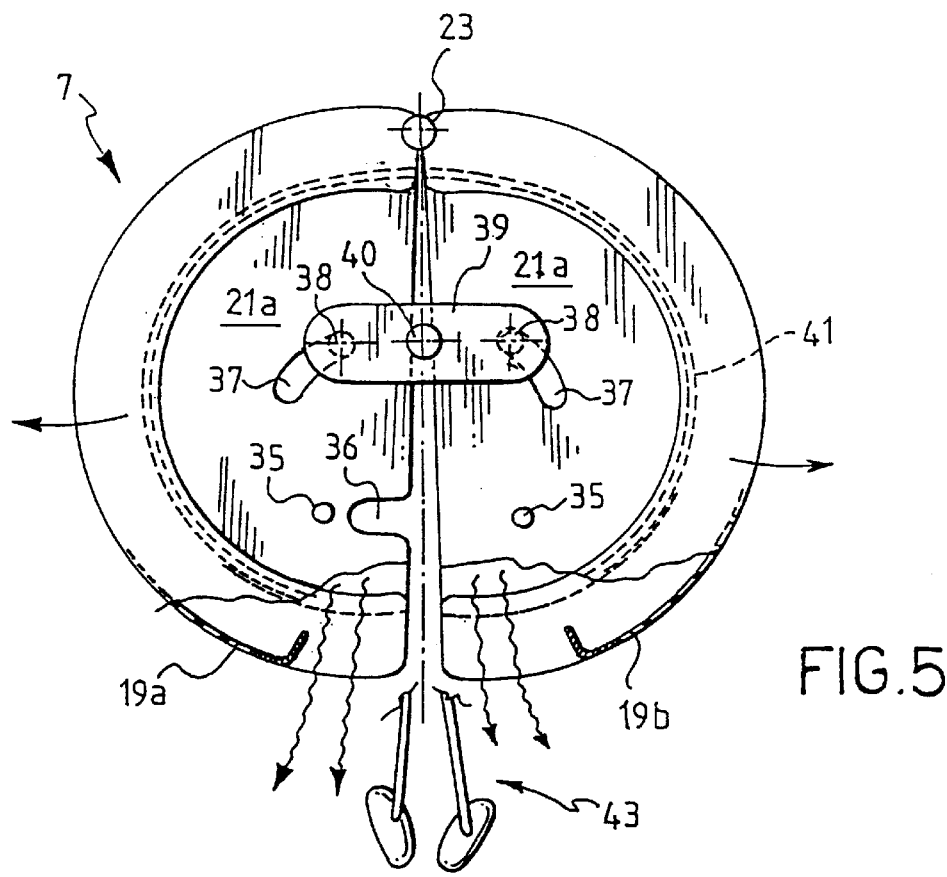

A slot 36 is formed on one of the head plates 21a and on one of the head plates 21b of the basket 7, in correspondence of the peg 35, in such a way to allow the housing of the peg 35 of the other head plate 21a, 21b when the basket 7 is brought into the closing position (FIG. 4).

The device according to the invention further comprises a pair of opposed plates 39 intended to limiting the opening of the basket 7, each comprising a pair of slide pins 38 intended to being housed within a pair of slide slots 37, wherein each slot 37 is provided on a respective head plate 21a, 21b.

Each plate 39 comprises a further peg 40, provided on the opposed side of the pair of slide pins 38. The peg 40 is adapted for being housed in the radially internal portion 30 of the seat 27 provided in the discs 24 for housing the basket 7.

In order to allow the opening/closing of the basket 7, this is provided with resilient means intended to maintaining the basket 7 in position of partial opening when in rest conditions.

Figure 3:
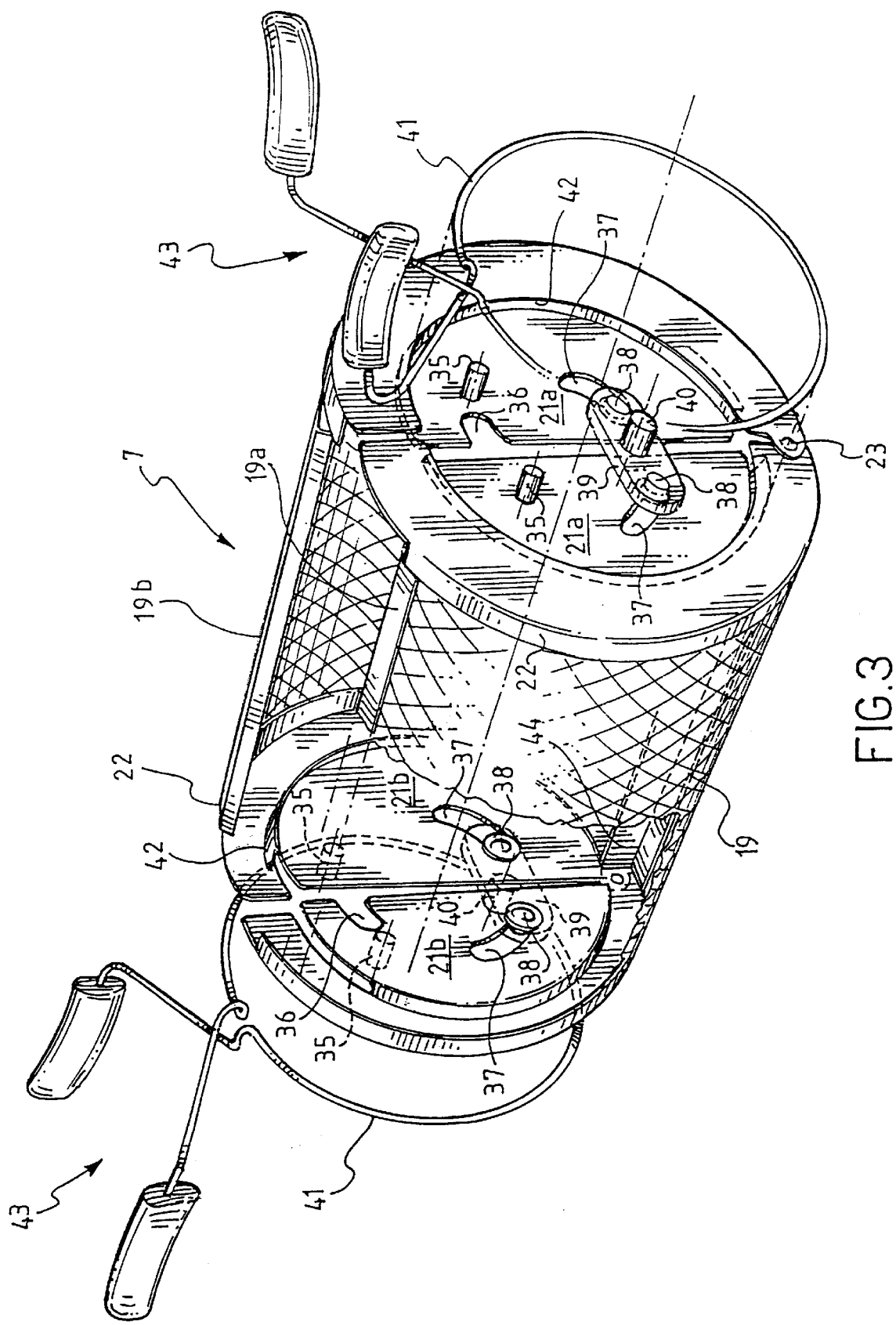
FIG. 3 shows a perspective exploded view of a detail of the device of FIG. 1 in a first working configurations (basket in open position)

A substantially annular spring 41 is housed in a respective peripheral seat 42 provided in the first and second head plates 21a, 21b and is intended, when loaded, to bringing the basket 7 into a position of greater opening (FIG. 3). The spring 41 is associated to pliers gripping means 43 intended to overcoming the elastic force of the spring itself when pliers are tightened so to move mutually away the two side surface portions 19a, 19b of the wire cylinder 19 and hence to open the basket 7 to a greater extent.

Advantageously, the basket 7 comprises inside it longitudinal fillets 44 made of stainless steel intended to facilitating the rolling of foodstuffs during the cooking so to optimize the cooking itself.

The cooking device according to the invention further comprises an electric motor 45 kinetically connected to the discs 24 in order to allow the rotation of the basket 7 during the cooking steps. In particular, the electric motor 45 is a gearmotor and is connected to the discs 24 through the interposition of a plurality of transmission gears. Such gears comprise two opposed sets of gear wheels 46, each one is in meshing engagement with a gear wheel 47 coaxially associated to each one of the discs 24 on the opposed side with respect to the cooking chamber 6 and integral with the disc 24 during the rotation. A countershaft 48, substantially parallel to the rotation axis X—X of the basket 7, is fixedly associated to two opposed gear wheels 49 in such a way to transfer the rotary motion from one set of gear wheels 46 to the other. A knob 48a for hand-controlling the rotation of the discs 24 is mounted externally to the body 2 and fit on the countershaft 48. The knob 48a allows the positioning of the discs 24 in the correct insertion/removal position, which corresponds to the position in which the funnel of the radially external portion 29 of the groove 28 provided in the discs 24 is aligned to the funnel of the groove 33 provided in the drive plates 32. Alternatively, the adjustment of the angular position of the discs 24 can be effected automatically.

Advantageously, the device 1 according to the invention further comprises an extractable drawer 50 housed below the container 5 in the support base 3 of the body 2. In a particularly advantageous embodiment of the present invention, the drawer 50 is not totally removable from the body 2 and is provided with an external handle 50a of plastic material (for example polypropylene) and with a removable tray 50b placed inside the drawer 50 and intended to being periodically removed for cleaning itself.

The cooking device 1 further comprises a knob 51a for controlling a timer 51 connected, in a per se known way, to the electric motor 45 and to the heating plates 16 and intended to setting the cooking time. A warning led (not illustrated) shows the device operative condition.

Finally, the body 2 has a form adapted for guaranteeing a significant ventilation inside the device 1.

In operation, the basket 7 is removed, acting on the gripping means 43 from inside the body 2, after having opened the lid 11. The foodstuffs to be cooked are introduced in the basket 7, which is brought into a position of complete opening, tightening the pliers 43 (FIG. 3). The basket 7 is therefore reintroduced in the body 2 through the window 9 and the lid 11 is brought into a closing position of the body itself. The basket 7, during the insertion step of the body 2 gradually closes; it is completely closed when the insertion thereof in the body 2 is completed (in such position, the peg 40 is housed at the bottom of the radially internal portion 30 of the groove 28 whereas the pegs 35 are housed in the intermediate portion 31 of the groove 28).

The pressure exerted by the tooth 15 on the safety switch 18 automatically activates the electric resistors that start warming up the cooking chamber 6. Acting on the knob 51a of the timer 51 the desired cooking time is set and the electric motor 45 is activated, so driving the rotation of the basket 7 for the pre-set cooking time.

The cooking of foodstuffs is effected by direct heat radiation from the electric resistors and by heat convection inside the cooking chamber 6. The basket rotation 7 takes place by the dragging action carried out by the discs 24, thanks to the pegs 35 housed in the intermediate portion 31 of the groove 28.

The activation of a sound signal indicates the end of cooking. Acting on the knob 48a, the basket 7 is brought in the correct removal position (that is, in a position such that the funnel of the radially external portion 29 of the groove 28 provided in the discs 24 is aligned with the funnel of the groove 33 provided in the drive plates 32, a position which is indicated by a dedicated notch on the knob 48a). At this point, the lid 11 is opened and the basket 7 is removed from the body 2. The basket 7 is now in position of partial opening. Acting on the pliers 43 the basket 7 may be opened to a greater extent, so as to pour out the foodstuffs just cooked (FIG. 5), ready to be served.

What is claimed is:

1. Domestic electric device for cooking food, characterized in that it comprises:
   a substantially parallelepiped container defining a cooking chamber for foodstuffs inside the chamber;
   a substantially cylindrical openable wire basket removably mounted inside the cooking chamber of the container to receive the foodstuffs to be cooked, the basket being rotatably motor-driven about a rotation axis X—X extending in a direction which is substantially horizontal and parallel to the pair of opposed first side walls of the container;
   a body provided, on an upper surface thereof, with a window adapted for allowing the insertion and the removal of the basket into and from the container cooking chamber, respectively; and
   heating means heating means mounted on a pair of opposed first side walls of the container for supplying direct radiant heat inside the cooking chamber to the foodstuffs.

2. Device according to claim 1, comprising a cover for closing the body during cooking.

3. Device according to claim 2, wherein the cover comprises a lid hinged onto the upper surface of the body adjacent the window.

4. Device according to claim 2, further comprising a safety switch for activating the heating means when the cover is in a closed position on the body and for deactivating the heating means when the cover is brought to an open position.

5. Device according to claim 1, further comprising a removable drawer housed in the body below the container.

6. Device according to claim 1, further comprising a pair of discs for supporting the basket, said discs being rotatably mounted in the container on a pair of opposed second side walls provided substantially perpendicular to the pair of opposed first side walls, the basket supporting discs being rotationally driven by an electric motor through a plurality of transmission gears interposed between the motor and the discs for rotating the basket.

7. Device according to claim 6, wherein the plurality of transmission gears comprises two opposed sets of gear wheels, each of which being in meshing engagement with a gear wheel coaxially mounted on each of the supporting discs of the basket, on the opposed side with respect to the cooking chamber and integral with said disc, and a countershaft substantially parallel to the rotation axis X—X of the basket, connected to two opposed gear wheels of the two sets of gear wheels for transmitting rotary motion from one set of gear wheels to the other.

8. Device according to claim 6, wherein each basket supporting disc has a side surface facing toward the inside of the cooking chamber and comprising a seat for housing the basket.

9. Device according to claim 8, wherein the seat for housing the basket comprises a groove extending in a substantially radial direction in the disc and having a radially external funnel-shaped portion and a radially internal substantially straight portion, an intermediate portion intended for transmitting the motion between the disc and the basket being provided between the radially external portion and the radially internal portion.

10. Device according to claim 6, further comprising two guiding plates mounted in the container on the pair of opposed second side walls above the basket supporting discs for facilitating the insertion of the basket into the cooking chamber.

11. Device according to claim 10, wherein each driving plate comprises a side wall facing toward the inside of the cooking chamber, wherein a funnel-shaped groove with a substantially vertical axis is provided, and a lower surface which is of a complementary shape with respect to the basket supporting disc.

12. Device according to claim 1, further comprising means for controlling the angular position of the basket inside the cooking chamber.

13. Device according to claim 12, wherein the means for controlling the angular position of the basket comprises a control knob mounted outside of the body on the countershaft.

14. Device according to claim 1, wherein the openable basket comprises a wire cylinder provided, in correspondence of a first generating line thereof, with opposed portions of adjacent side surfaces, said portions being mutually when the basket is maneuvered for opening and closing thereof, respectively.

15. Device according to claim 14, wherein the wire cylinder comprises two essentially semicylindrical wire surfaces, each one being adjacent, relative to respective base ends, to opposed first and second essentially semicircular head plates, each plate of the first and second head plates of one of the two wire surfaces being hinged to the other plate of the first and second head plates of the other wire surface along a second generating line of the cylinder, which is diametrically opposite to the first generating line.

16. Device according to claim 15, wherein each wire surface is disposed relative to the respective head plates at a peripheral edge thereof, and extends for a smaller angle than the extension angle of the plates themselves, each plate of the first and second head plates of one of the two wire surfaces partially laying on the other plate of the first and second head plates of the other wire surface when the basket is brought in the closing position, in such a way that the two portions of side surface of the wire cylinder are moved to a position where they are adjacent and side-by-side.

17. Device according to claim 16, wherein each plate comprises at least one motion transmission peg intended to being housed in the intermediate portion of the groove provided in the basket support discs, to provide rotation of the basket.

18. Device according to claim 1, further comprising means for controlling the opening/closing of the basket.

19. Device according to claim 18, wherein the means for controlling the opening/closing of the basket comprises resilient means which, in the rest position, maintains the basket in condition of partial opening and, when loaded, brings the basket in a position of greater opening.

20. Device according to claim 19, wherein the resilient means comprises an essentially annular spring housed in a respective peripheral seat formed in the first and second head plates and pliers-shaped gripping means intended to contrast the elastic force of the spring when the pliers are tightened, so to move mutually away the two portions of side surface of the wire cylinder and therefore open the basket.

21. Device according to claim 1, further comprising means for limiting the opening of the basket.

22. Device according to claim 21, wherein the means for limiting the opening of the basket comprises a pair of plates, each provided with a pair of slide pins, adapted to be housed in a respective slide slot provided on each one of the first and second head plates.

23. Device according claim 22, wherein each plate comprises, on the opposed side with respect to the pair of slide pins, a further peg adapted to be housed in the radially internal portion of the seat for supporting the basket in the basket supporting discs.

* * * * *